Figure 1:
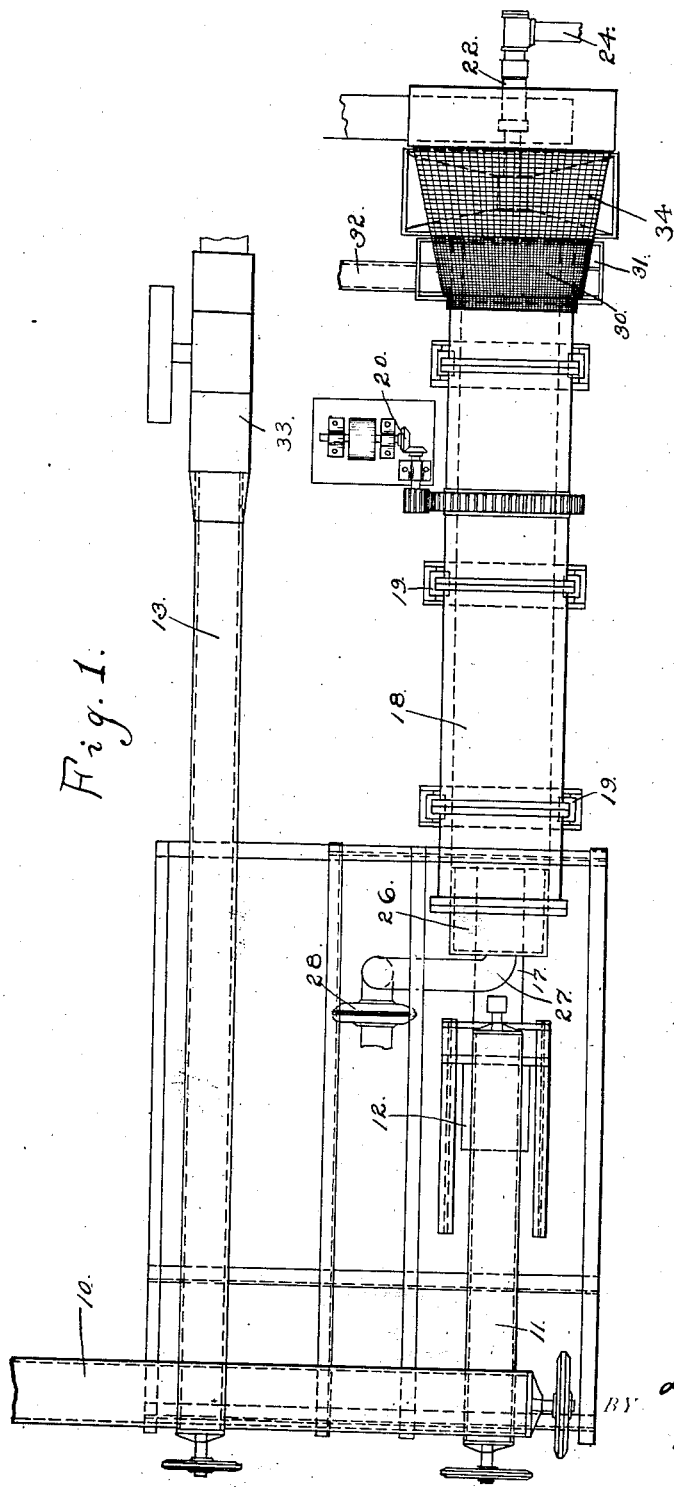

L. P. BAUER.
STARCH IN GRANULAR FORM AND PROCESS OF MAKING THE SAME.
APPLICATION FILED JUNE 21, 1915.

1,175,113.

Patented Mar. 14, 1916.
2 SHEETS—SHEET 1.

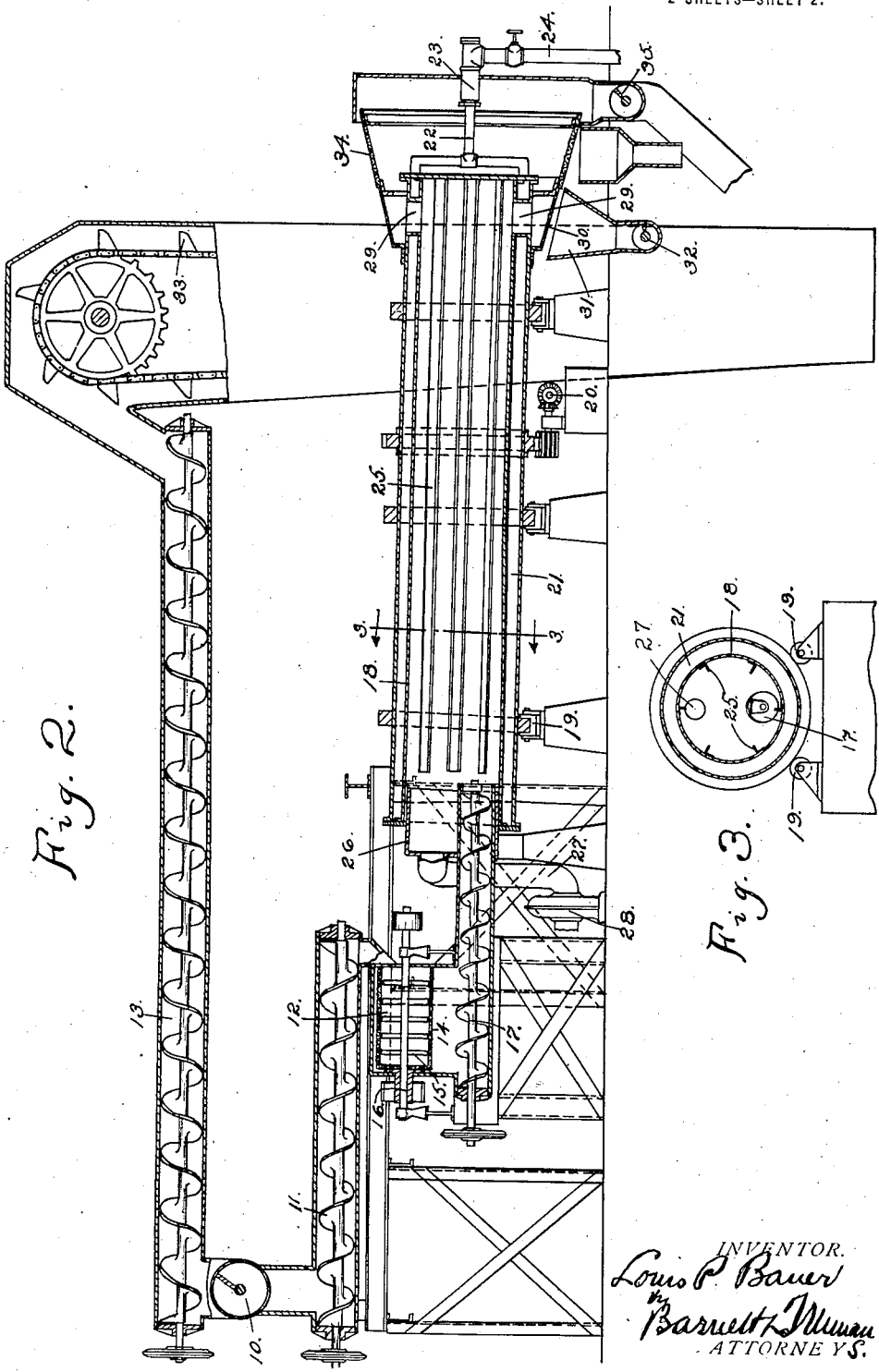

UNITED STATES PATENT OFFICE.

LOUIS P. BAUER, OF CHICAGO, ILLINOIS, ASSIGNOR TO CORN PRODUCTS REFINING COMPANY, A CORPORATION OF NEW JERSEY.

STARCH IN GRANULAR FORM AND PROCESS OF MAKING THE SAME.

1,175,113.  Specification of Letters Patent.  Patented Mar. 14, 1916.

Application filed June 21, 1915. Serial No. 35,334.

*To all whom it may concern:*

Be it known that I, LOUIS P. BAUER, a citizen of the United States, residing at Chicago, in the county of Cook and State of Illinois, have invented certain new and useful Improvements in Starch in Granular Form and Processes of Making the Same, of which the following is a specification.

My invention relates to the production of a granular starch, that is, starch in the form of small, relatively hard and compact pellets, lumps or particles which will readily break down in water to form a starch milk, free of sediment and residue, which will be sufficiently hard and compact so that they will not be readily broken up and reduced to powder by crushing or attrition when transported or otherwise handled, and, which are of such character that the material will flow easily, when poured, instead of packing and clogging as is apt to be the case with ordinary dry starch which often contains a considerable amount of fine powder.

The principal object of the invention is to provide a starch product which may be used in brewing as a substitute for rice, corn grits, but more particularly for corn starch in its usual commercial forms. The latter is very desirable for brewing purposes because of its relatively low price and because it contains no residual material. The disadvantage of using starch is due to its powdery character caused, for example, by its handling in transit. As a result it often clogs and sticks in the conveyers, elevators, and chutes through which it passes from the starch bins to the mashing vats. Furthermore, its use is likely to fill the air with fine starch dust which settles upon the wet floors, machinery and elsewhere, and is, therefore, highly objectionable. Rice and corn grits are much more easily handled but rice is quite expensive and corn grits contain considerable quantities of residual material having no value in the brewing process, such as the glutenous part of the corn. Corn grits are also likely to contain considerable quantities of oil which may taint the beer.

My invention provides a material composed preferably entirely of starch and having all the advantages of starch for this purpose but may be handled as conveniently as rice or corn grits.

While this product is intended particularly for brewing purposes the invention is not limited to its use in this connection.

The granular starch of my invention is made by taking wet starch, comminuting it and then drying the comminuted material under conditions which prevent any substantial amount of gelatinization. If the pellets or particles are gelatinized to any appreciable extent the product is of no practical value to the brewers. The reason for this is that gelatinized starch, after it has dried, is practically inert to any inverting medium such as diastatic enzym of malt. It will soften somewhat in water but will not dissolve or break up. If pellets or particles of starch be formed having their outer surfaces gelatinized such particles or pellets will not break up into starch milk in the mash and therefore the starch which they contain is not acted on by the enzym of the malt and converted into maltose. It is, of course, true that all starch manufactured by ordinary commercial methods will contain, or is at least likely to contain, traces of gelatinization. This is due to imperfections in the methods of manufacture which cannot be wholly overcome. My product may, therefore, show minute traces of gelatinized starch. This, however, is incidental and unimportant if the amount is very small. The manufacture should be carried out so as to prevent such gelatinization as far as is possible to do so.

In the accompanying drawings I have shown an apparatus suitable for practising the process of my invention although it will be readily understood that the invention is by no means limited to the use of this particular apparatus.

In the drawings Figure 1 is a plan view of the apparatus. Fig. 2 is a longitudinal sectional elevation of the same, and Fig. 3 is a cross sectional view on line 3—3 of Fig. 2.

Like characters of reference designate like parts in the several figures of the drawings.

The apparatus shown is intended particularly for the manufacture of a product in which the starch is moistened by water although it will be possible to use other liquids or semi-liquids for this purpose. More particularly the process contemplates using starch taken directly from the settling tables. When water is used for moistening the starch I find it most desirable to have the starch contain about thirty-five to forty per cent. of water. If the starch is too moist it will be likely to paste or gelatinize. It is a fact that starch containing considerable moisture will become gelatinized more readily at the same temperature than starch containing less water. The starch taken from the starch tables ordinarily contains from forty-five to fifty per cent. of moisture. This is too high a percentage for my purpose and the apparatus shown therefore provides for mixing a certain amount of dry starch with the table starch so as to reduce the proportion of water.

In the drawings, 10 designates a screw conveyer for breaking up and conveying the wet starch from the starch tables to a conveyer 11 which delivers the material into a comminuting mill 12.

13 is a conveyer for the dry starch which delivers into conveyer 10. The dry starch is mixed with the wet starch during the course of the material through the conveyers 10 and 11. In the mill 12 is arranged a cylindrical screen 14 preferably rotated by suitable driving means in which are beaters 15 arranged on a shaft 16 which is rotated in the direction opposite to that of the cylindrical screen 14. The material is comminuted by being forced through the screen 14. It falls into a conveyer 17 which delivers it into the rotary drier 18. The latter is supported on rollers 19 and driven by driving mechanism 20. The drier is shown as provided with a steam jacket 21 having a steam connection 22 revolubly connected by a stuffing box 23 with the stationary steam pipe 24. The interior of the drier is provided with angular shelves 25 which keep the material in constant movement and agitation during the drying operation. The upper end of the drier drum turns upon a stationary hub 26 to which is connected the induction pipe 27 of a suction fan 28. This creates and maintains a constant draft of air through the drier in the direction opposite to the movement of the material therethrough. In this way the vapors produced in the drying operation are removed from contact with the starch as soon as formed. This is important as gelatinization will result if starch is allowed to remain for any appreciable time in an atmosphere of steam. The dried material is discharged through openings 29 in the lower end of the drum. Any powdered starch that there may be in the drier, together with the smaller particles, pass through a fine mesh screen 30 into a hopper 31 from whence they are carried by conveyer 32 to a dry starch elevator 33 which supplies dry starch to the conveyer 13. The material in the form of pellets or particles of the proper size, that is to say, the product of my process, passes through a screen 34 of larger mesh than screen 29. Any large lumps that there may be tail off from screen 33 and are collected in a hopper 35.

By the use of the term "pellets" I do not intend that the starch bodies are necessarily spherical in form. They are preferably somewhat rounded, but are quite irregular both in size and shape, resembling in their shape small gravel stones. The term "pellet" is intended to convey the idea that the starch bodies are of such size and shape that the material will readily flow when poured, in much the same way that grain or granular bodies will flow.

I claim:

1. Ungelatinized starch in the form of relatively hard, compact pellets which will flow readily when the material is handled in bulk and will break down in water to form starch milk without leaving any residue.

2. Granular, ungelatinized corn starch.

3. Starch in the form of bodies, relatively hard and compact, and capable of breaking down in water to form starch milk without any residue.

4. A starch product consisting of ungelatinized starch in granular form.

5. A starch product consisting of raw starch in the form of relatively hard, compact bodies.

6. The method of producing starch in granular form which consists in comminuting wet starch and drying the same under conditions which prevent any appreciable gelatinization.

7. The method of producing starch in granular form which consists in comminuting wet starch and subjecting the comminuted material to a drying process in which the vapors are removed from contact with the material as formed.

8. The method of producing starch in granular form which consists in comminuting wet starch and passing the comminuted material through a drier through which a circulation of air is maintained in a direction opposite to the direction of movement of the material.

9. The method of producing starch in granular form which consists in mixing starch and a liquid, comminuting the material and subjecting the same to a drying process in which the vapors are removed from contact with the material as they are formed.

10. The method of producing starch in granular form which consists in mixing starch and water, comminuting the material and subjecting the same to a drying process in which the vapors are removed from contact with the material as they are formed.

11. The method of producing starch in granular form which consists in mixing starch and a liquid, comminuting the material and passing the comminuted material through a drier through which a circulation of air is maintained in a direction opposite to the direction of movement of the material.

12. The method of producing starch in granular form which consists in mixing starch and water, comminuting the material and passing the comminuted material through a drier through which a circulation of air is maintained in a direction opposite to the direction of movement of the material.

13. The method of producing starch in granular form which consists in comminuting starch containing approximately thirty-five to forty per cent. of water and drying the comminuted material under conditions which prevent gelatinization.

14. The method of producing starch in granular form which consists in comminuting starch containing approximately thirty-five to forty per cent. of water and subjecting the comminuted material to a drying process in which the vapors are removed from contact with the material as formed.

15. The method of producing starch in granular form which consists in comminuting wet starch and causing it to be rolled over a hard surface and subjected to a drying operation in which the vapors are removed from contact with the material as formed.

16. The method of producing starch in granular form which consists in comminuting the material, introducing the same into a rotary drier and withdrawing the vapors from the drier as they are formed.

17. The method of producing starch in granular form which consists in comminuting wet starch, causing the comminuted material to be passed through a rotary drier, and maintaining a draft through said drier in a direction opposite to the movement of the starch therethrough.

LOUIS P. BAUER.

Witnesses:
L. A. FALKENBERG,
G. Y. SKINNER.